United States Patent [19]
Nakane et al.

[11] Patent Number: 5,264,911
[45] Date of Patent: Nov. 23, 1993

[54] LASER POWER MEASURING JIG FOR OPTICAL DISK UNIT

[75] Inventors: Kazuhiko Nakane; Masayoshi Shimamoto; Yoshihiro Kiyose; Keiji Nakatsu; Isao Watanabe, all of Amagasaki; Masami Horita, Hova; Kenichi Sato, Nakano; Kenji Shimozawa, Mitaka; Hiroshi Konuma, Shinjuku; Masaharu Yoshimura, Urawa, all of Japan

[73] Assignees: Mitsubishi Electric Corporation; Teac Corp., Japan

[21] Appl. No.: 810,209

[22] Filed: Dec. 19, 1991

[30] Foreign Application Priority Data

| Dec. 20, 1990 | [JP] | Japan | 2-404552 |
| Dec. 21, 1990 | [JP] | Japan | 2-405300 |
| Dec. 25, 1990 | [JP] | Japan | 2-405625 |
| Dec. 25, 1990 | [JP] | Japan | 2-405626 |
| Dec. 25, 1990 | [JP] | Japan | 2-405627 |

[51] Int. Cl.⁵ ............... G01J 1/42; G11B 3/90
[52] U.S. Cl. .................. 356/218; 356/243; 369/54; 369/116
[58] Field of Search ........... 356/213, 218, 221, 226, 356/121, 243; 369/54, 116; 250/201.5, 205; 372/29-31, 33

[56] References Cited

U.S. PATENT DOCUMENTS

| 3,966,325 | 6/1976 | Mohler | 356/218 |
| 4,832,487 | 5/1989 | Mikuriya et al. | 356/237 |
| 4,988,194 | 1/1991 | Hara et al. | 356/243 |

*Primary Examiner*—Richard A. Rosenberger
*Assistant Examiner*—Hoa Q. Pham
*Attorney, Agent, or Firm*—Andrus, Sceales, Starke & Sawall

[57] ABSTRACT

A laser power measuring jig is adapted for use in measuring a laser power of a laser beam which is emitted from an optical head of an optical disk unit which records and/or reproduces information on and/or from a medium. The laser power measuring jig supplies power information related to the laser power of the laser beam to a power meter which measures the laser power. The laser power measuring jig includes a main jig body which has a size and a shape which are approximately the same as those of the medium, and this main jig body is loaded into the optical disk unit. The laser power measuring jig also includes a mechanism for outputting the power information outside the optical disk unit and supplying the laser power information to the power meter when the main jig body is loaded into the optical disk unit.

10 Claims, 18 Drawing Sheets

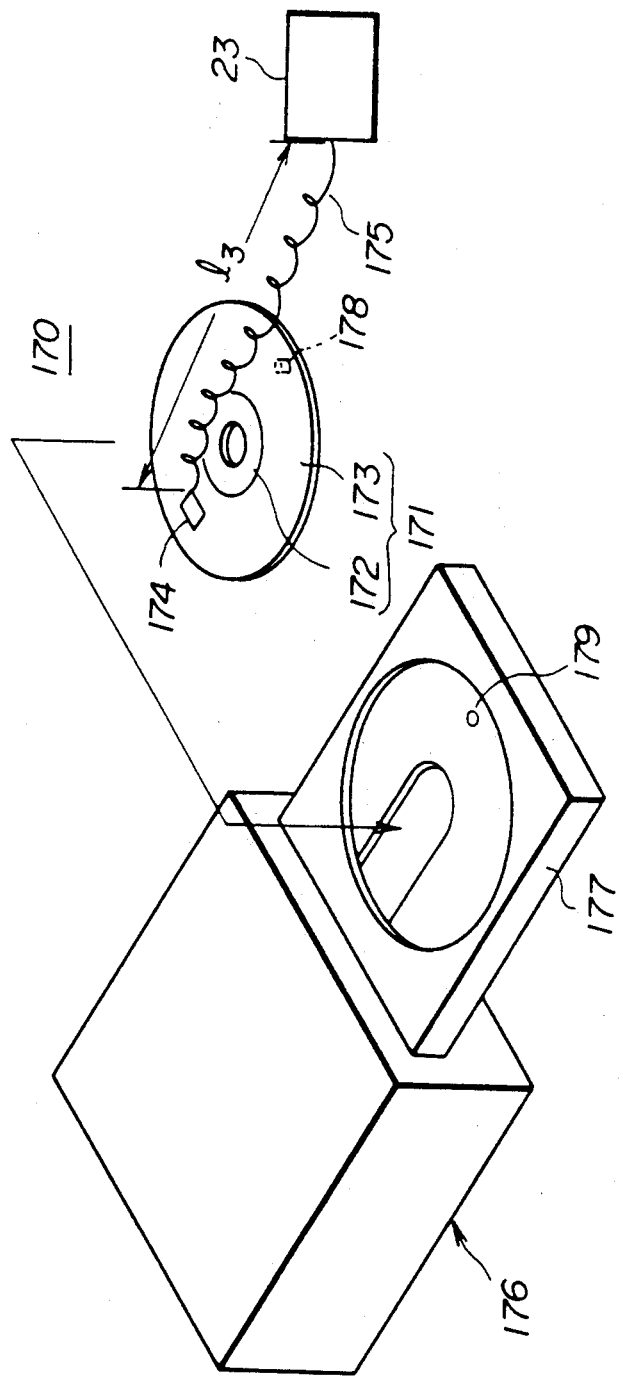

LASER POWER MEASURING JIG FOR OPTICAL DISK UNIT

BACKGROUND OF THE INVENTION

The present invention generally relates to jigs and methods for measuring laser power, and more particularly to a jig and a method for measuring the power of a laser beam which is emitted from an optical head of an optical disk unit.

In optical disk units, the power of the laser beam emitted from the optical head affects the signal-to-noise (S/N) ratio when recording and reproducing information on and from an optical disk. For this reason, the laser power is one of the important items to be managed during an inspection process which is carried out when the optical disk unit is completed and during a maintenance operation which is carried out after completion of the optical disk unit. Various adjustments are made according to the needs based on the results of the laser power measurement.

The optical head includes a laser diode, a plurality of optical elements and an objective lens. The laser beam which is emitted from the laser diode of the optical head passes through the plurality of optical elements before being outputted via the objective lens, and thus, the laser beam becomes attenuated after passing through the optical elements. In order to measure the laser power so as to appropriately adjust the laser power, it is necessary to detect the laser beam at the position of the surface of the optical disk which is loaded into the optical disk unit and measure the laser power of the laser beam which is outputted via the objective lens. When actually making this laser power measurement, it is desirable that the measurement can be made with a high operational efficiency.

Conventionally, the laser power is measured using a sensor 1 shown in FIG. 1 which is on the market. First, an outer cover 3 of an optical disk unit 2 is removed, and a plurality of screws are removed to remove a printed circuit assembly 4 which is provided on the upper part of the optical disk unit 2. As a result, the inside of the optical disk unit 2 is exposed.

In this state, the sensor 1 which is coupled to a power meter 5 is arranged above an objective lens 7 of an optical head 6 so as to measure the laser power. For this reason, there are problems in that it takes time to prepare for the laser power measurement, and that it is necessary to reassemble the optical disk unit 2 back into its original state after the laser power measurement. In other words, it is difficult to make the laser power measurement with a high operational efficiency.

SUMMARY OF THE INVENTION

Accordingly, it is a general object of the present invention to provide a novel and useful jig and a method for measuring laser power in an optical disk unit, in which the problems described above are eliminated.

Another and more specific object of the present invention is to provide a laser power measuring jig adapted for use in measuring a laser power of a laser beam which is emitted from an optical head of an optical disk unit which records and/or reproduces information on and/or from a medium, the laser power measuring jig supplying power information related to the laser power of the laser beam to a power meter which measures the laser power, the laser power measuring jig comprising a main jig body which has a size and a shape which are approximately the same as those of the medium, the main jig body being loaded into the optical disk unit, and information output means, provided within the main jig body, for outputting the power information outside the optical disk unit and supplying the laser power information to the power meter when the main jig body is loaded into the optical disk unit. According to the laser power measuring jig of the present invention, it is possible to measure the laser power without having to disassemble the optical disk unit such as having to remove an upper printed circuit assembly.

Still another object of the present invention is to provide a method of measuring a laser power of a laser beam which is emitted from an optical head of an optical disk unit which records and/or reproduces information on and/or from a medium which is loaded into the optical disk unit via an inserting opening, the method comprising the steps of (a) loading a laser power measuring jig into the optical disk unit via the inserting opening of the optical disk unit, (b) obtaining power information related to the laser power of the laser beam outside the optical disk unit, and (c) measuring the laser power based on the power information using a power meter. According to the method of the present invention, it is possible to measure the laser power without having to disassemble the optical disk unit such as having to remove an upper printed circuit assembly.

Other objects and further features of the present invention will be apparent from the following detailed description when read in conjunction with the accompanying drawings.

BRIEF DESCRIPTION OF THE DRAWINGS

FIG. 24 is a perspective view for explaining a thirteenth embodiment of the laser power measuring jig according to the present invention.

DESCRIPTION OF THE PREFERRED EMBODIMENTS

First, a description will be given of a first embodiment of a laser power measuring jig, by referring to FIGS. 2 through 5. FIGS. 2 through 5 show a laser power measuring jig 10.

Figure 8:
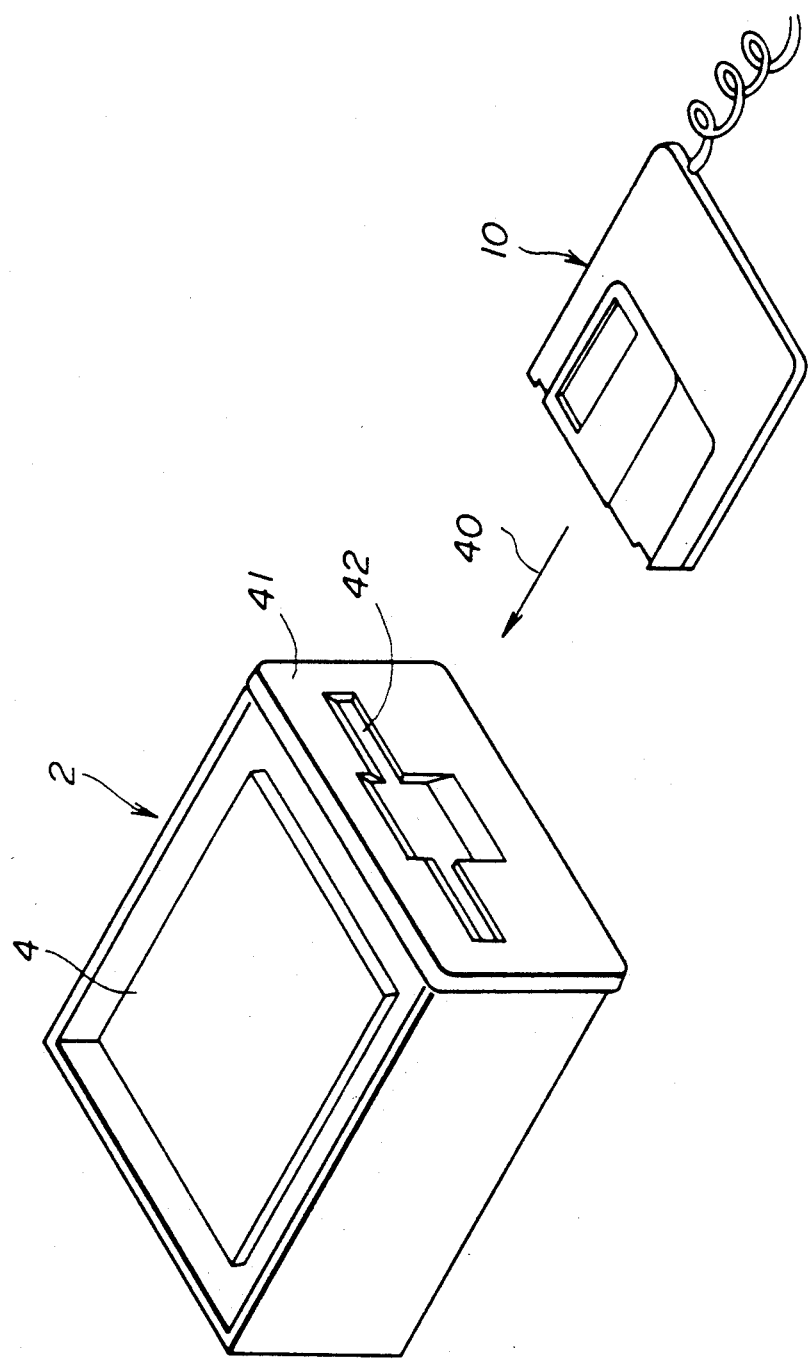
FIG. 8 is a perspective view for explaining the method of use of the first embodiment of the laser power measuring jig.

A main jig body 11 has a shape and size which are approximately the same as the shape and size of an optical disk case (or cartridge) which is loaded into an optical disk unit 2 shown in FIG. 8. Hence, the main jig body 11 can be loaded into the optical disk unit 2 similarly to the optical disk case. The main jig body 11 has a shutter 13 which corresponds to a shutter which is provided on the optical disk case.

Figure 5:
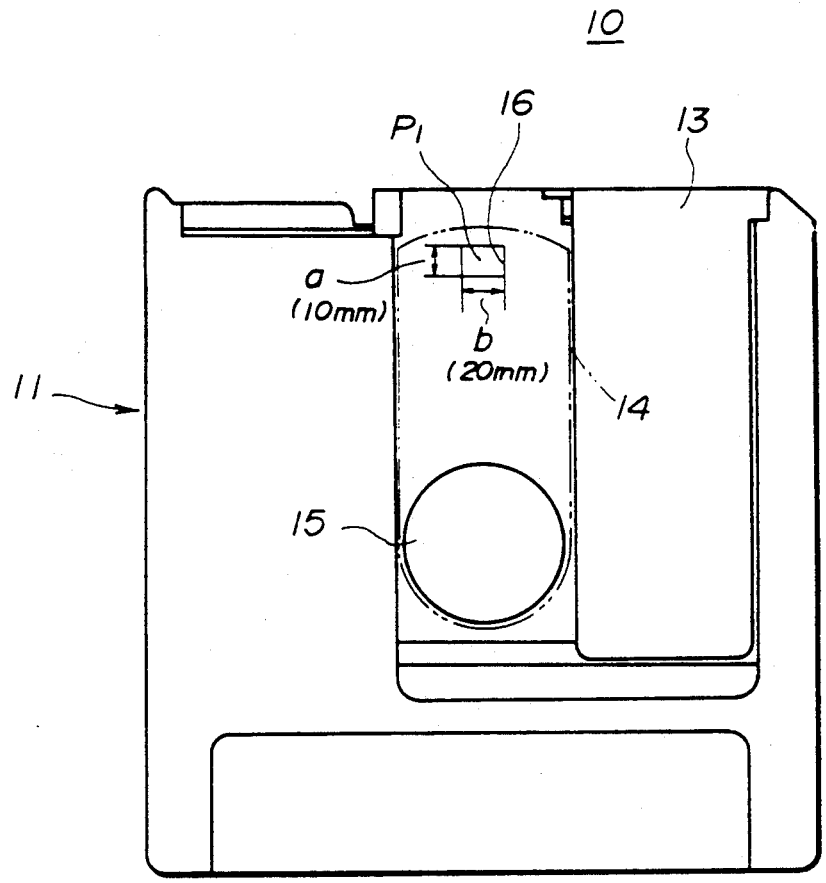
FIG. 5 is a bottom view of the first embodiment of the laser power measuring jig in a state where a shutter is open in FIG. 4.
Figure 6:
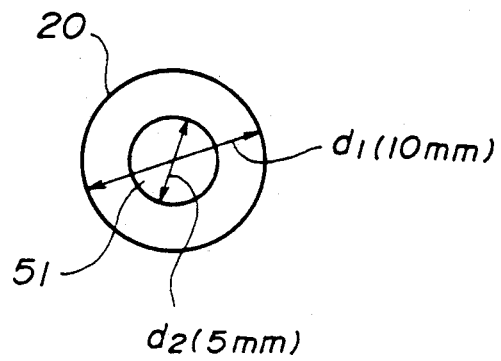
FIG. 6 is a diagram for explaining a photoelectric conversion element and a laser spot.

When the shutter 13 is open as shown in FIG. 5, an approximately rectangular opening 14 indicated by a two-dot chain line becomes exposed in the case of the optical disk case. However, in the case of the main jig body 11, a turntable opening 15 and a laser beam introducing opening 16 become exposed when the shutter 13 is open. The opening 16 is located at a position P1 which confronts an objective lens of an optical head 6 in a waiting position when the main jig body 11 is loaded into the optical disk unit 2. In particular, the opening 16 is formed in a vicinity of a front edge of the main jig body 11 and has a small size of a (=10 mm)×b (=20 mm).

Figure 1:
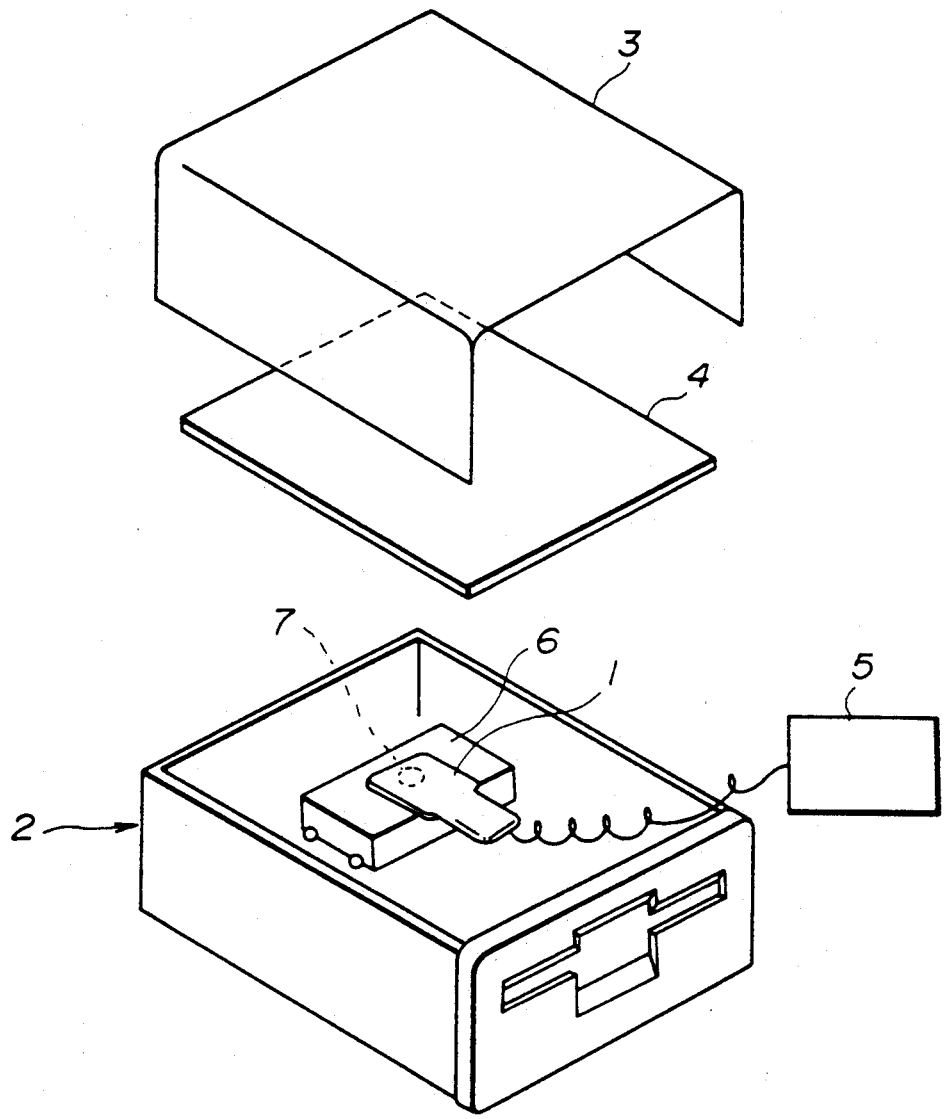
FIG. 1 is a perspective view for explaining a conventional method of measuring laser power.
Figure 2:
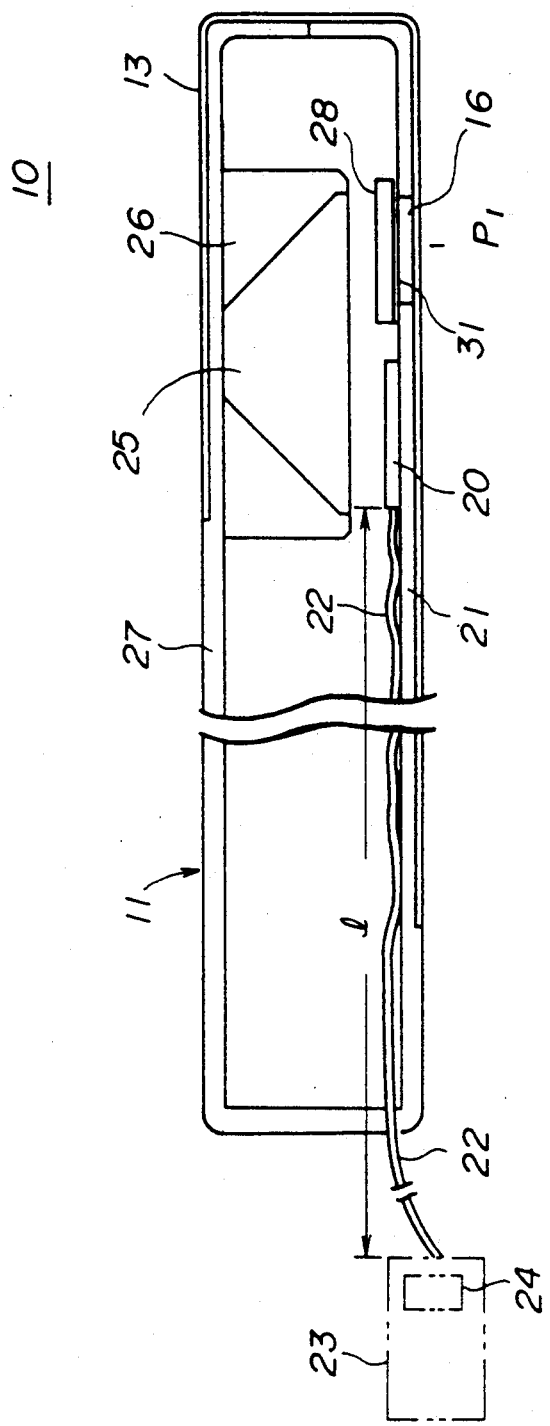
FIG. 2 is a cross sectional view showing an internal structure of a first embodiment of a laser power measuring jig according to the present invention.
Figure 3:
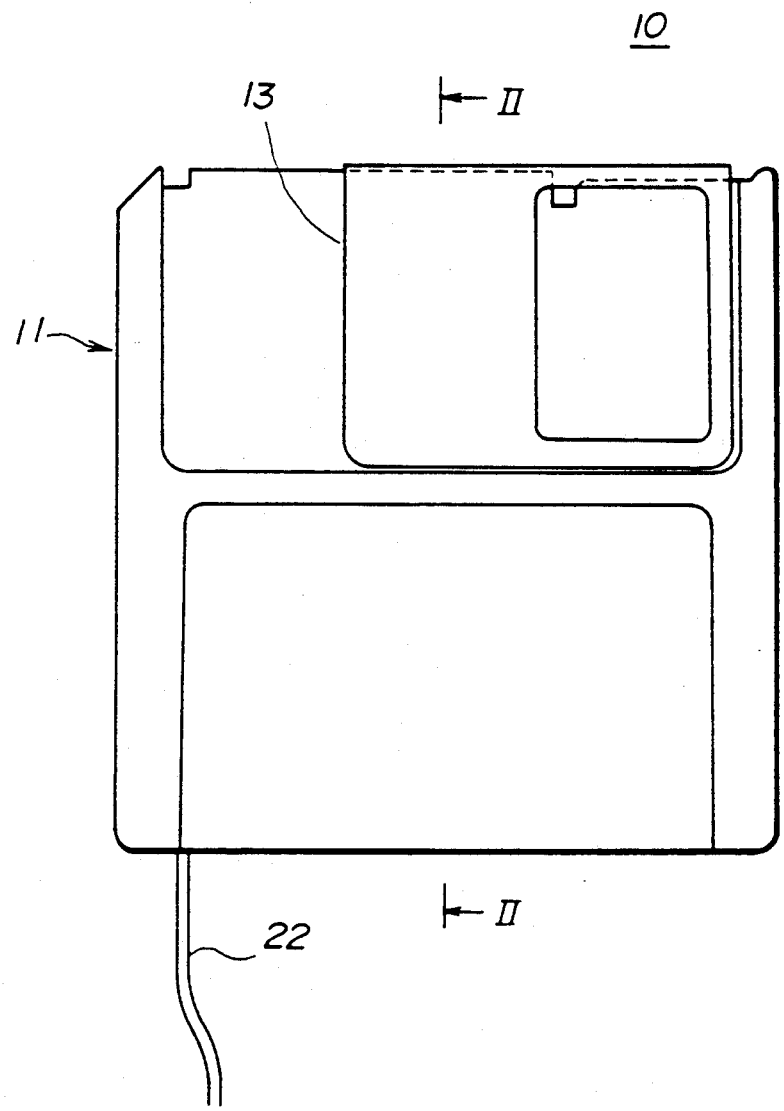
FIG. 3 is a plan view of the first embodiment of the laser power measuring jig.
Figure 4:
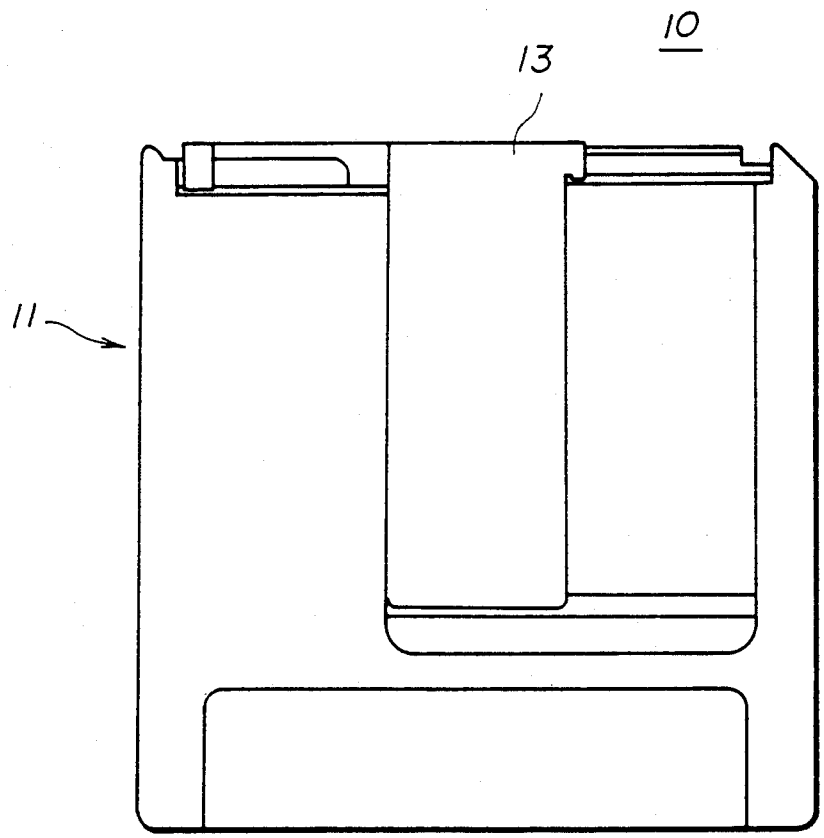
FIG. 4 is a bottom view of the first embodiment of the laser power measuring jig.
Figure 7:
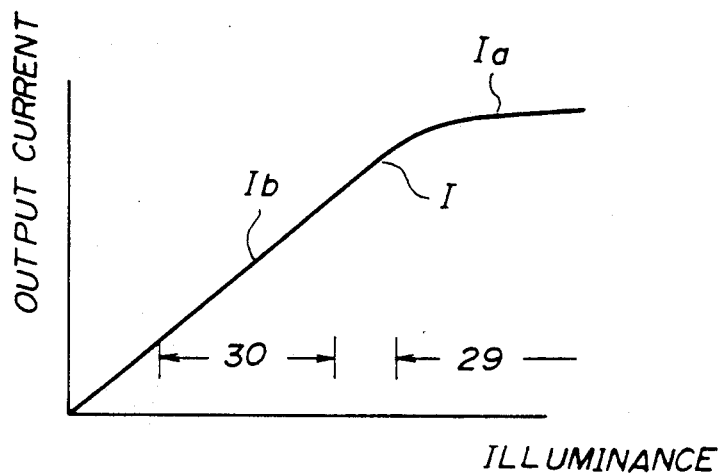
FIG. 7 shows an output current versus illuminance characteristic of the photoelectric conversion element.
Figure 9:
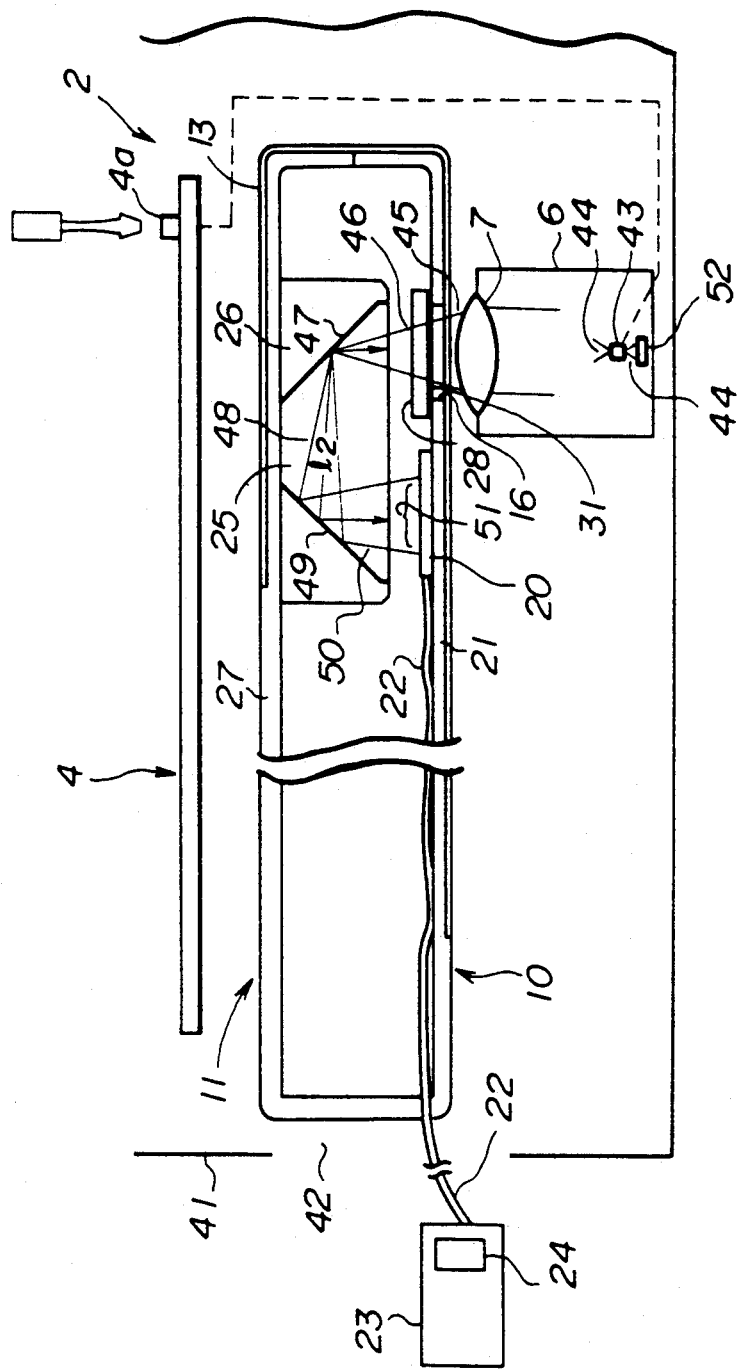
FIG. 9 is a cross sectional view for explaining the measurement of the laser power using the first embodiment of the laser power measuring jig.

The internal structure of the main jig body 11 is as shown in FIG. 2 which shows the cross section along a line II—II in FIG. 3. A photoelectric conversion element 20 shown in FIG. 2 has a disk shape with a diameter d1 of approximately 10 mm. This photoelectric conversion element 20 is fixed on an inner surface of a bottom plate 21 of the main jig body 11. The photoelectric conversion element 20 has an output current versus illuminance characteristic I shown in FIG. 7. In FIG. 7, the illuminance is taken at a light receiving surface of the photoelectric conversion element 20. Wires 22 from the photoelectric conversion element 20 are drawn to the outside of the main jig body 11. The wires 22 have a length $l_1$ so that the tip ends of the wires 22 pass through an inserting opening 42 of the optical disk unit 2 and extend to the outside of the optical disk unit 2 as shown in FIG. 9 when the main jig body 11 is loaded into the optical disk unit 2. The wires 22 are coupled to a power meter 23. A compensation circuit 24 for compensating the an attenuation in a filter 28 is built within the power meter 23. The compensation circuit 24 and the filter 28 will be described later.

A prism 25 has a truncated pyramid shape and is used as an element for enlarging a spot diameter of the laser beam. The prism 25 is fixed to an inner surface of a top plate 27 of the main jig body 11 by a holder 26. As will be described later, this prism 25 has the function of increasing the length of an optical path from the optical head 6 to the photoelectric conversion element 20, so that the spot size is increased on the photoelectric conversion element 20.

The filter 28 attenuates the laser power of the laser beam which is emitted from the optical head 6 so that the illuminance on the photoelectric conversion element 20 falls within a proportional region 30 which is lower than a saturation region 29 in FIG. 7. The saturation region 29 corresponds to a saturation curve part Ia of the characteristic I shown in FIG. 7, and the proportional region 30 corresponds to a sloping linear part Ib of the characteristic I.

A reflection preventing layer 31 having a multi-layer structure is formed on a lower surface of the filter 28. The reflection preventing layer 31 has a characteristic for absorbing a light component having a wavelength of 780 nm or 800 nm, and prevents the laser beam from being reflected back to the optical head 6. The filter 28 is fixed on an upper surface of the bottom plate 21 of the main jig body 11 and covers the opening 16.

Next, a description will be given of the method of measuring the laser power of the laser beam which is emitted from the optical head 6 of the optical disk unit 2, using the jig 10 having the construction described above.

For example, the laser power is measured during an inspection process which is carried out immediately before the completion of the optical disk unit 2. In this state immediately before the completion of the optical disk unit 2, the assembling of the optical disk unit 2 is completed except for only the external cover which is to be mounted on the optical disk unit 2, and as shown in FIG. 8, a front bezel 41 and an upper printed circuit assembly 4 are already mounted on the optical disk unit 2.

The main jig body 11 is inserted into the optical disk unit 2 via an inserting opening 42 in the front bezel 41 as indicated by an arrow 40 in FIG. 8, similarly as when the optical disk case is inserted, without removing the upper printed circuit assembly 4. As a result, the main jig body 11 is loaded into a position shown in FIG. 9 within the optical disk unit 2. In this state, the opening 16 of the main jig body 11 confronts an objective lens 7 of the optical head 6 as shown in FIG. 9, and the photoelectric conversion element 20 optically confronts the objective lens 7.

The laser beam 44 which is emitted to the front from the laser diode 43 within the optical head 6 passes through a plurality of optical elements (not shown) before being output via the objective lens 7 as a convergent bundle of rays. The laser beam 45 emitted from the optical head 6 irradiates the inside of the main jig body 11 via the opening 16, and is attenuated via the filter 28. An attenuated laser beam 46 which is outputted from the filter 28 reaches the prism 25 and generally converges on a surface 47. The attenuated laser beam 46 is reflected by the surface 47 and becomes a laser beam 48 which is a divergent bundle of rays and propagates horizontally in FIG. 9. The laser beam 48 is further reflected by a surface 49 of the prism 25 and becomes a laser beam 50 which is a divergent bundle of rays and propagates downwardly in FIG. 9. The laser beam 50 which is outputted via the prism 25 irradiates the photoelectric conversion element 20 as a spot 51.

The photoelectric conversion element 20 outputs a current when irradiated by the spot 51. This current is obtained outside the optical disk unit 2 via the wires 22. In other words, information related to the laser power of the laser beam 45 emitted from the optical head 6 is converted into an electric signal and is obtained outside the optical disk unit 2 via a moving path through which the optical disk case is inserted into and extracted from the optical disk unit 2. The current from the photoelectric conversion element 20 is supplied to a power meter 23. The power meter 23 has the built-in compensation circuit 24, and the laser power of the laser beam 45 emitted from the optical head 6 is displayed on a display (not shown) of the power meter 23. The laser power is measured by monitoring the display of the power meter 23. When the measured value does not fall within a tolerable range, an adjusting member 4a provided on the printed circuit assembly 4 is appropriately manipulated to adjust the driving current of the laser diode 43 so that the laser power falls within the tolerable range. When the laser power measurement is finished, an eject operation is made to eject the main jig body 11 outside the optical disk unit 2. The main jig body 11 is ejected similarly as when the optical disk case is ejected from the optical disk unit 2.

As may be readily understood from the description above, the main jig body 11 need only be treated similarly to the ordinary optical disk case. There is no need to disassemble a part of the optical disk unit 2 when connecting the jig 10. Therefore, the laser power of the laser beam 45 emitted from the optical head 6 can be measured with a high operational efficiency.

As described in the following, the prism 25, the filter 28 and the reflection preventing layer 31 of the jig 10 function so as to improve the accuracy and reliability of the laser power measurement which is made in respect of the laser beam 45 which is emitted from the optical head 6.

First, the prism 25 increases the optical path of the laser beam within the main jig body 11 to $l_2$. As a result, the laser beam 45 emitted from the optical head 6 is once converged before reaching the photoelectric conversion element 20 as the divergent bundle of rays, and the spot 51 on the photoelectric conversion element 20 becomes considerably large as shown in FIG. 5. A diameter d2 of the spot 51 is approximately 5 mm. For this reason, the measuring error caused by a non-uniform sensitivity distribution on the surface of the photoelectric conversion element 20 is suppressed to a small value, and the measuring accuracy is improved.

On the other hand, if no prism 25 were provided, the spot diameter on the photoelectric conversion element 20 would be approximately 1.5 to 2.5 mm and small.

Second, the laser power of the laser beam 45 emitted from the optical head 6 is 10 mW or greater. Hence, if this laser beam 45 is irradiated directly on the photoelectric conversion element 20, the illuminance will fall within the saturation region 29 shown in FIG. 7 and the laser power measurement will be impossible. But because the filter 28 is provided, the laser power of the laser beam 45 is attenuated to less than 10 mW, and the illuminance on the photoelectric conversion element 20 falls within the linear region 30 shown in FIG. 7. Accordingly, the deviation of the laser power becomes proportional to the output current of the photoelectric conversion element 20, and the laser power can be measured accurately. In addition, it is possible to directly measure the laser power and no conversion is required since the compensation circuit 24 corresponding to the characteristic of the filter 28 is provided. Consequently, the laser power measurement can be made efficiently.

Third, the reflection preventing layer 31 prevents the laser beam 45 from the optical head 6 from reflecting back into the main jig body 11. The center wavelength of the laser beam 44 emitted from the laser diode 8 is 780 nm or 830 nm. On the other hand, the reflection preventing layer 31 has a reflectivity characteristic II shown in FIG. 10 such that the reflectivity is zero with respect to the wavelengths in a vicinity of 800 nm. As a result, it is possible to prevent a part of the laser beam 45 emitted from the optical head 6 from reflecting back to the optical head 6 and reaching the laser diode 43, and it is possible to prevent the reflected beam from transmitting through the laser diode 43 and irradiating a monitoring part 52. Hence, the monitoring part 52 can correctly monitor the laser beam 44 which is emitted from the laser diode 43, and the laser diode 43 operates normally similarly as when recording information on and reproducing information from the optical disk. Therefore, the laser power of the laser beam 45 emitted from the optical head 6 becomes the same as that at the time of the recording and reproduction, and the laser power of the laser beam 45 can be measured accurately.

Figure 11:
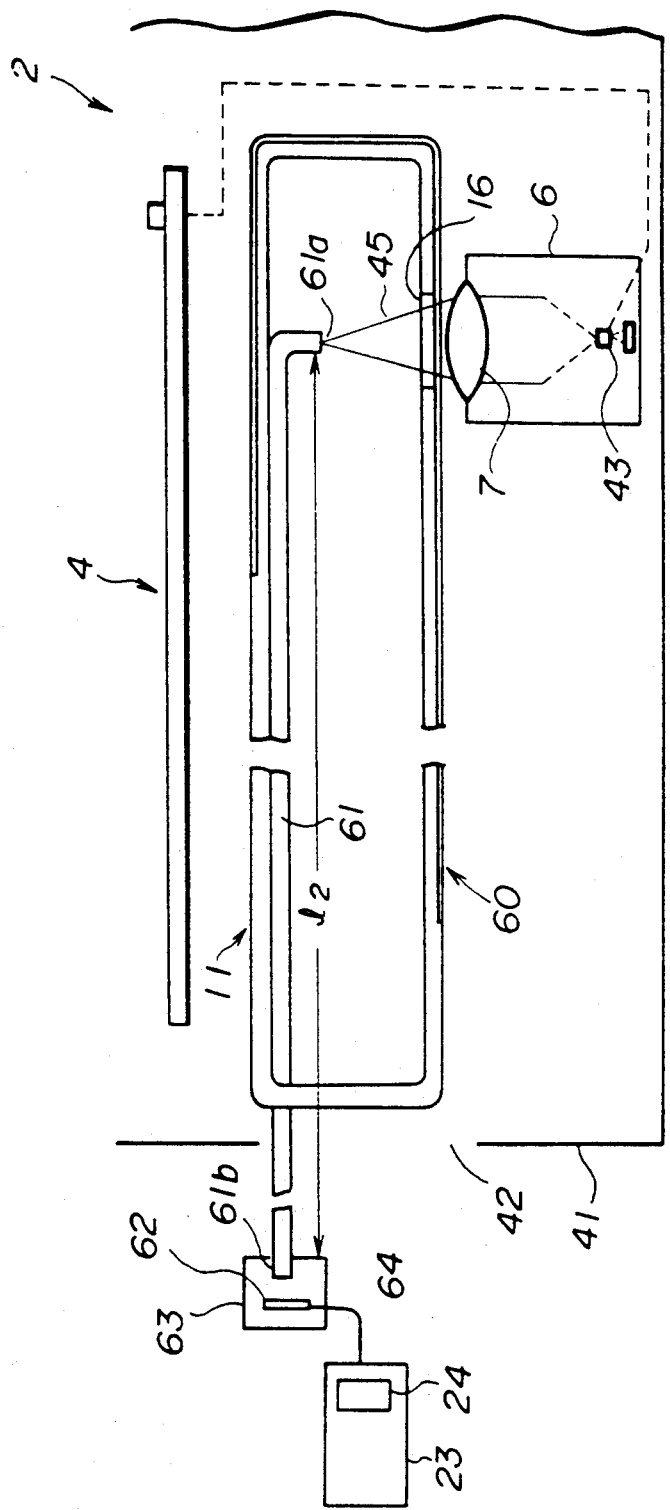
FIG. 11 is a cross sectional view for explaining a second embodiment of the laser power measuring jig according to the present invention.

Next, a description will be given of a second embodiment of the laser power measuring jig according to the present invention, by referring to FIG. 11. In FIG. 11, those parts which are the same as those corresponding parts in FIGS. 2 through 9 are designated by the same reference numerals, and a description thereof will be omitted.

A laser power measuring jig 60 shown in FIG. 11 is made up of a main jig body 11. One end 61a of an optical fiber 61 is fixed within the main jig body 11, while another end 61b of the optical fiber 61 is drawn to the outside of the main jig body 11. A length $l_2$ of the optical fiber 61 is such that the optical fiber 61 passes through the inserting opening 42 of the optical disk unit 2 and the end 61b of the optical fiber 61 reaches the outside of the optical disk unit 2 in a state where the main jig body 11 is loaded into the optical disk unit 2. The end 61a of the optical fiber 61 is located at a position confronting the opening 16. A photoelectric conversion part 63 having a built-in photoelectric conversion element 62 is provided at the end 61b of the optical fiber 61. Wires 64 from the photoelectric conversion element 62 are drawn out of the photoelectric conversion part 63 and is coupled to the power meter 23.

Figure 10:
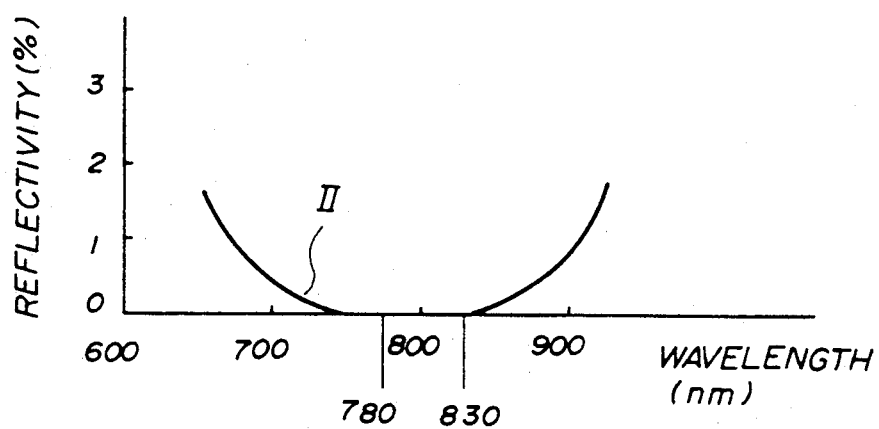
FIG. 10 shows a reflectivity versus wavelength characteristic of a reflection preventing layer.

When measuring the laser power, the main jig body 11 of the jig 60 is loaded into the optical disk unit 2 similarly as in the case show in FIG. 10. In this case, the laser beam 45 emitted from the optical head 6 enters inside the main jig body 11 and enters the optical fiber 61 from the end 61a. The laser beam 45 passes through the optical fiber 61 and is drawn outside the optical disk unit 2, and is converted into a corresponding current by the photoelectric conversion element 62 of the photoelectric conversion part 63. The output current of the photoelectric conversion element 62 is supplied to the power meter 23 via the wires 64.

Figure 12:
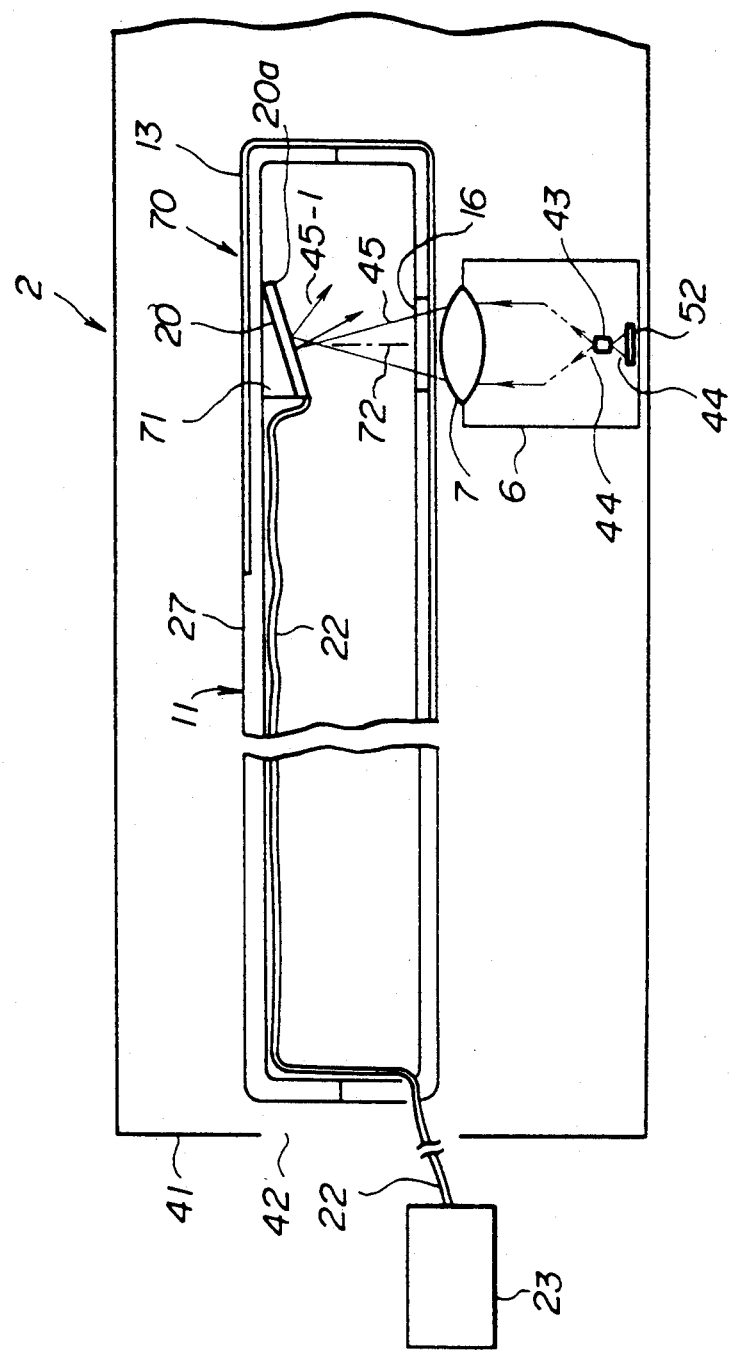
FIG. 12 is a cross sectional view for explaining a third embodiment of the laser power measuring jig according to the present invention.
Figure 13:
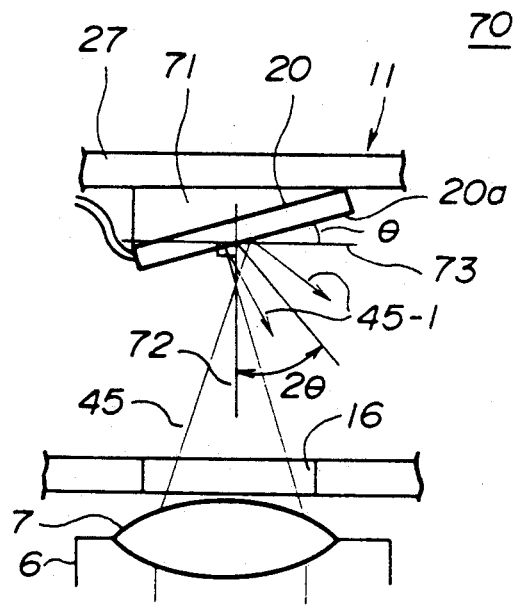
FIG. 13 is a cross sectional view showing an essential part of the third embodiment shown in FIG. 12 on an enlarged scale.

Next, a description will be given of a third embodiment of the laser power measuring jig according to the present invention, by referring to FIGS. 12 and 13. In FIGS. 12 and 13, those parts which are the same as those corresponding parts in FIGS. 2 through 9 are designated by the same reference numerals, and a description thereof will be omitted.

A laser power measuring jig 70 shown in FIG. 12 is made up of a main jig body 11. A support jig 70 having a triangular cross section is fixed on the inner surface of the top plate 27 of the main jig body 11. The photoelectric conversion element 20 is mounted on a lower surface of the support 71.

As shown in FIG. 12 and in FIG. 13 on an enlarged scale, a surface 20a of the photoelectric conversion element 20 is inclined by an angle $\theta$ with respect to a plane 73 which is perpendicular to a center line 72 of the laser beam 45. For this reason, a part 45-1 of the laser beam 45 reflected by the surface 20a of the photoelectric conversion element 20 is directed in a direction which is inclined by an angle $2\theta$ with respect to the center line 72. In other words, the part 45-1 of the laser beam 45 travels in a direction away from the optical head 6 and will therefore not enter the optical head 6.

Accordingly, the optical head 6 operates similarly as when recording information on and reproducing information from the optical disk, and the laser power of the laser beam 45 emitted from the optical head 6 can be measured accurately similarly to the first embodiment.

Figure 14:
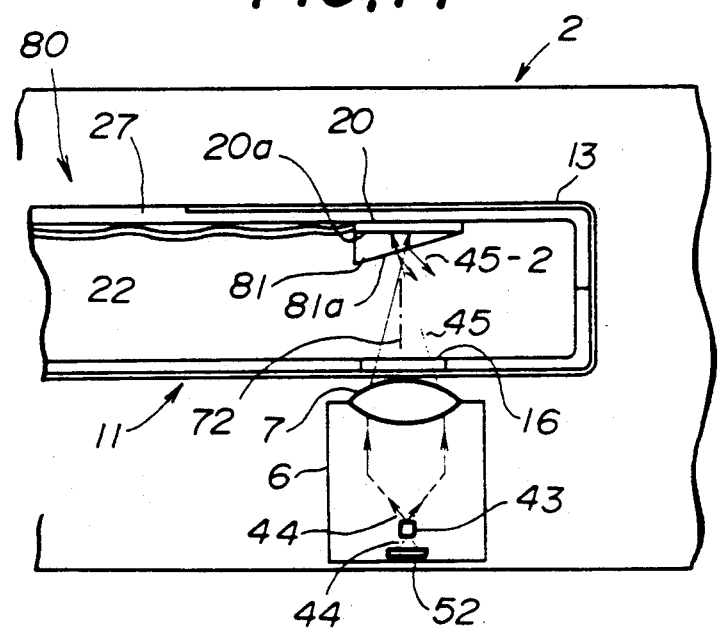
FIG. 14 is a cross sectional view for explaining a fourth embodiment of the laser power measuring jig according to the present invention.
Figure 15:
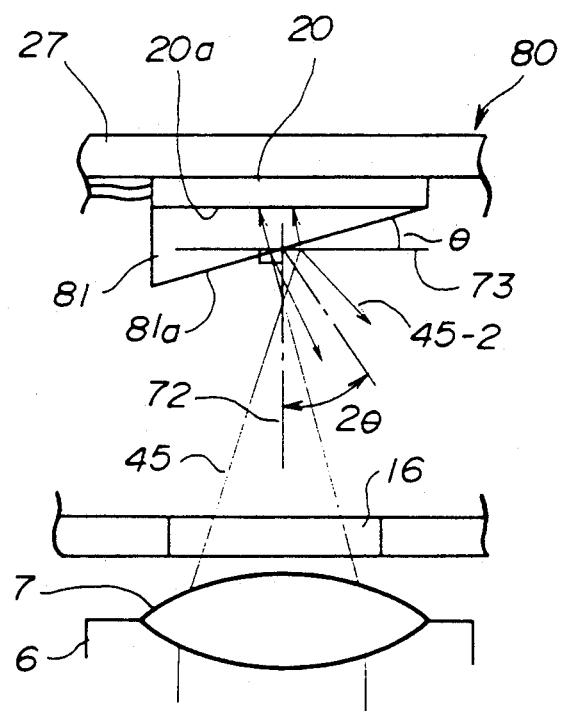
FIG. 15 is a cross sectional view showing an essential part of the fourth embodiment shown in FIG. 14 on an enlarged scale.

Next, a description will be given of a fourth embodiment of the laser power measuring jig according to the present invention, by referring to FIGS. 14 and 15. In FIGS. 14 and 15, those parts which are the same as those corresponding parts in FIGS. 2 through 9, 12 and 13 will be designated by the same reference numerals, and a description thereof will be omitted.

A laser power measuring jig 80 shown in FIG. 14 is made up of a main jig body 11, and the photoelectric conversion element 20 is fixed to the inner surface of the top plate 27 of the main jig body 11. A cover 81 made of glass and having a triangular cross section is provided on the surface 20a of the photoelectric conversion element 20.

As shown in FIG. 15 on an enlarged scale, a surface 81a of the cover 81 is inclined by an angle $\theta$ with respect to the plane 73 which is perpendicular to the center line 72 of the laser beam 45 which is emitted from the optical head 6. For this reason, a part 45-2 of the laser beam 45 reflected by the surface 81a of the cover 81 is directed in a direction which is inclined by an angle $2\theta$ with respect to the center line 72. In other words, the part 45-2 of the laser beam 45 travels in a direction away from the optical head 6 and will therefore not enter the optical head 6.

Therefore, the optical head 6 operates similarly as when recording information on and reproducing information from the optical disk, and the laser power of the laser beam 45 emitted from the optical head 6 can be measured accurately similarly to the first embodiment.

Figure 16:
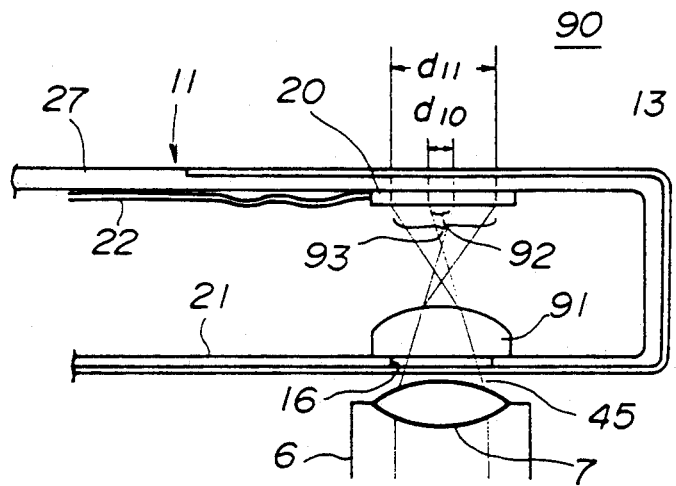
FIG. 16 is a cross sectional view for explaining a fifth embodiment of the laser power measuring jig according to the present invention.

Next, a description will be given of a fifth embodiment of the laser power measuring jig according to the present invention, by referring to FIG. 16. In FIG. 16, those parts which are the same as those corresponding parts in FIGS. 2 through 9 are designated by the same reference numerals, and a description thereof will be omitted.

A laser power measuring jig 90 shown in FIG. 16 is made up of a main jig body 11. A lens 91 for enlarging the laser spot is provided on the bottom plate 21 of the main jig body 11 at the position of the opening 16. The photoelectric conversion element 20 is provided on the inner surface of the top plate 27 of the main jig body 11 at a position confronting the opening 16.

The laser beam 45 which is emitted from the objective lens 7 of the optical head 6 would travel as indicated by a two-dot chain line in FIG. 16 and form a spot 92 having a diameter d10 on the photoelectric conversion element 20 if no lens 91 were provided. But since the lens 91 is provided in this embodiment, the laser beam 45 is refracted as indicated by a solid line in FIG. 16 and a spot 93 having a diameter d11 is formed on the photoelectric conversion element 20. This diameter d11 of the spot 93 is greater than the diameter d10 of the spot 92. As a result, the measurement error caused by the non-uniform sensitivity distribution on the surface of the photoelectric conversion element 20 is suppressed to an extremely small value.

Figure 17:
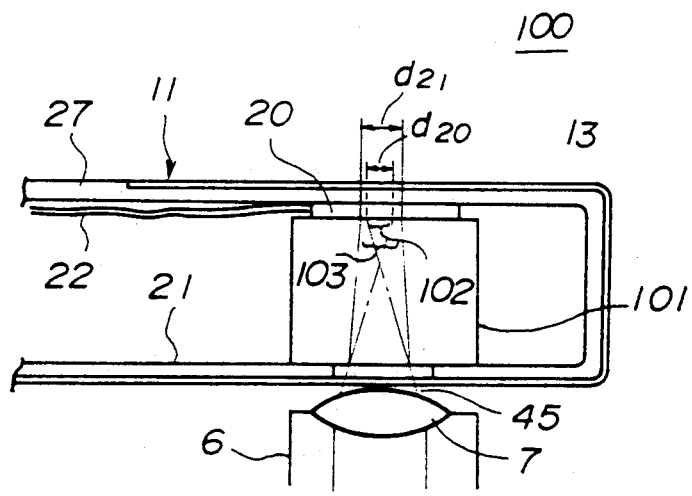
FIG. 17 is a cross sectional view for explaining a sixth embodiment of the laser power measuring jig according to the present invention.

Next, a description will be given of a sixth embodiment of the laser power measuring jig according to the present invention, by referring to FIG. 17. In FIG. 17, those parts which are the same as those corresponding parts in FIGS. 2 through 9 are designated by the same reference numerals, and a description thereof will be omitted.

A laser power measuring jig 100 shown in FIG. 17 is made up of a main jig body 11, and a glass block 101 for enlarging the laser spot is provided within the main jig body 11 at the position of the opening 16. The photoelectric conversion element 20 is provided on the lower surface of the top plate of the main jig body 11 at a position confronting the opening 16. The glass block 101 occupies the space between the bottom surface 21 of the main jig body 11 and the photoelectric conversion element 20.

The laser beam 45 emitted from the objective lens 7 of the optical head 6 would travel as indicated by a two-dot chain line in FIG. 17 and form a spot 102 having a diameter d20 on the photoelectric conversion element 20 if no glass block 101 were provided. However, by the provision of the glass block 101, the laser beam 45 is refracted as indicated by a solid line in FIG. 17, and a spot 103 having a diameter d21 is formed on the photoelectric conversion element 20. The diameter d21 of the spot 103 is greater than the diameter d20 of the spot 102. Accordingly, the measurement error caused by the non-uniform sensitivity distribution on the surface of the photoelectric conversion element 20 is suppressed to an extremely small value.

Figure 18:
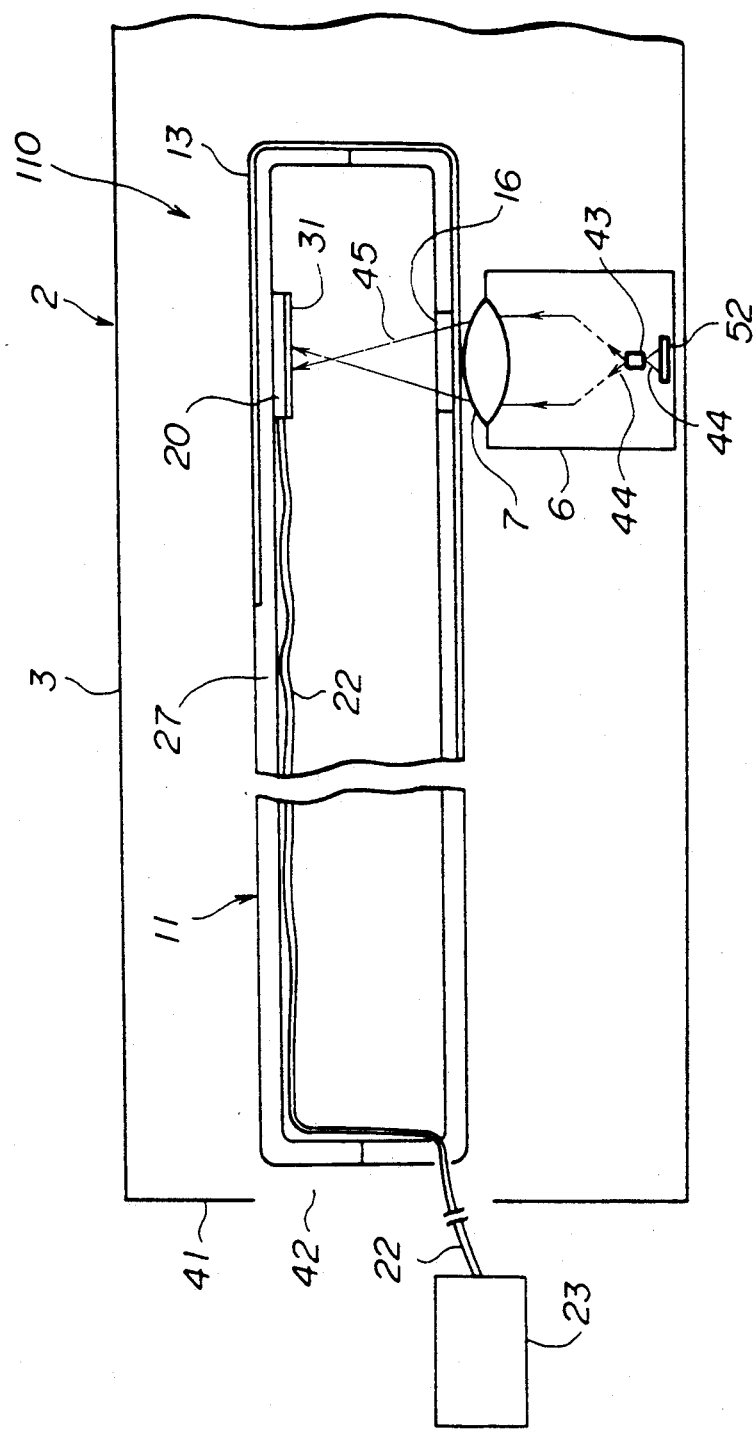
FIG. 18 is a cross sectional view for explaining a seventh embodiment of the laser power measuring jig according to the present invention.

Next, a description will be given of a seventh embodiment of the laser power measuring jig according to the present invention, by referring to FIG. 18. In FIG. 18, those parts which are the same as those corresponding parts in FIGS. 2 through 9 are designated by the same reference numerals, and a description thereof will be omitted.

This seventh embodiment and an eighth embodiment which will be described later both use a reflection preventing layer different from the reflection preventing layer 31 shown in FIG. 2.

A laser power measuring jig 110 shown in FIG. 18 is made up of a main jig body 11, and a reflection preventing layer 31 is formed on the surface of the photoelectric conversion element 20 which is fixed on the op plate 27. Hence, the laser beam 45 will not reflect at the surface of the photoelectric conversion element 20.

Figure 19:
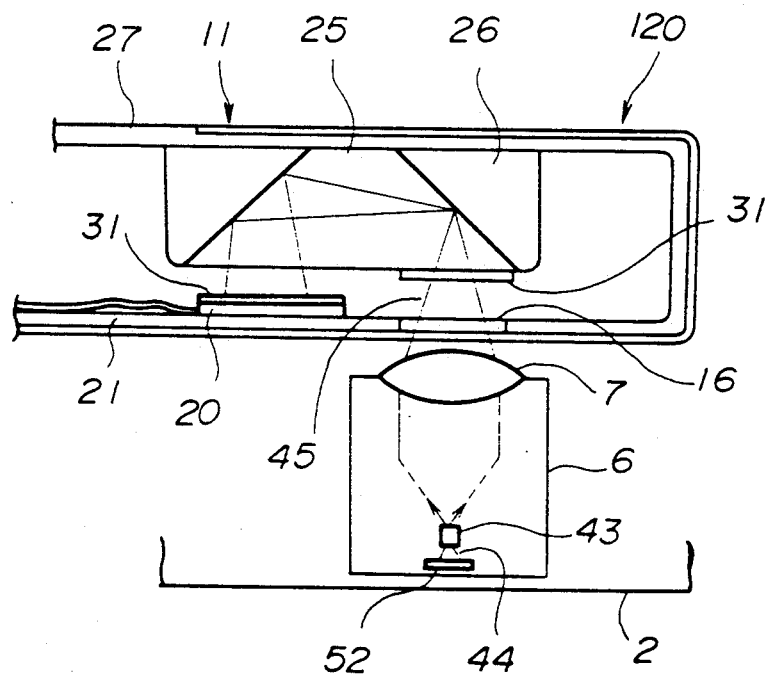
FIG. 19 is a cross sectional view for explaining an eighth embodiment of the laser power measuring jig according to the present invention.

Next, a description will be given of an eighth embodiment of the laser power measuring jig according to the present invention, by referring to FIG. 19. In FIG. 19, hose parts which are the same as those corresponding parts in FIGS. 2 through 9 are designated by the same reference numerals, and a description thereof will be omitted.

A laser power measuring jig 120 shown in FIG. 19 is made up of a main jig body 11, and a reflection preventing layer 31 is formed on the surface of the photoelectric conversion element 20 and on a part of the prism 25 confronting the opening 16. Hence, the laser beam 45 will not reflect at the surface of the photoelectric conversion element 20 or at the part of the prism 25 where the laser beam 45 is incident to.

Figure 20:
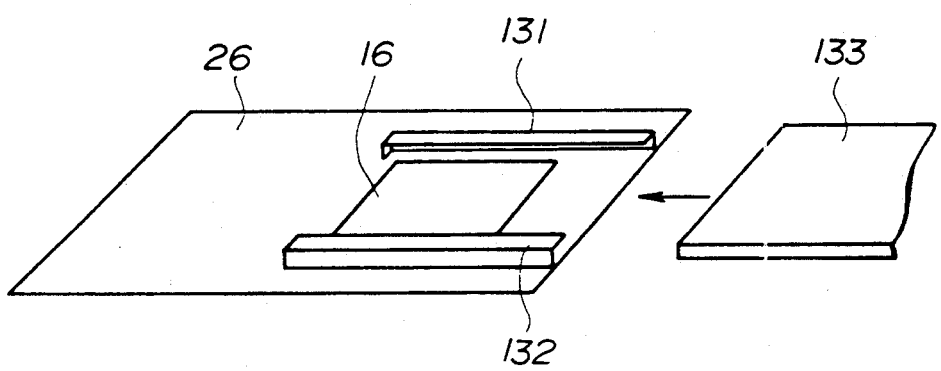
FIG. 20 is a perspective view showing an essential part of a ninth embodiment of the laser power measuring jig according to the present invention.

Next, a description will be given of a ninth embodiment of the laser power measuring jig according to the present invention, by referring to FIG. 20. In FIG. 20, those parts which are the same as those corresponding parts in FIGS. 2 through 9 are designated by the same reference numerals, and a description thereof will be omitted.

This ninth embodiment and tenth through twelfth embodiments which will be described later all use a filter which is different from the filter 28 shown in FIG. 2.

A laser power measuring jig 130 shown in FIG. 20 is made up of a main jig body 11, and guide rails 131 and 132 are provided on the bottom plate 26 of the main jig body 11. A plurality of kinds of filters having mutually different transmittances are prepared in advance, and a filter 133 having an optimum transmittance for the laser power measurement is inserted and mounted on the main jig body 11 The filter 133 may be changed if needed.

Figure 21:
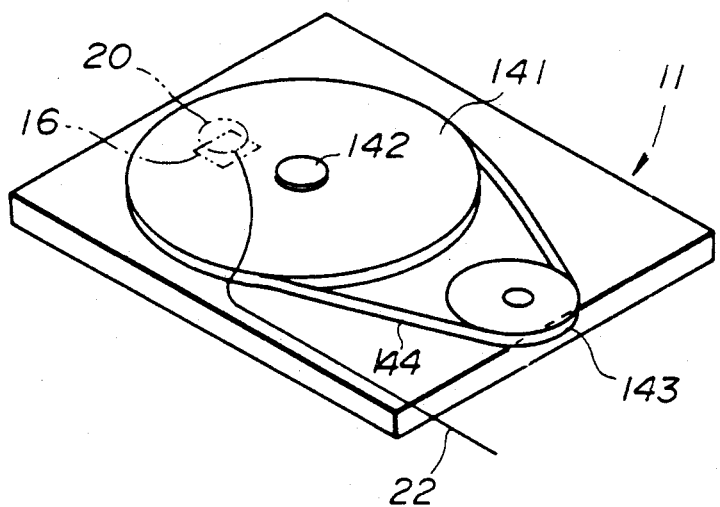
FIG. 21 is a perspective view generally showing a tenth embodiment of the laser power measuring jig according to the present invention.

Next, a description will be given of the tenth embodiment of the laser power measuring jig according to the present invention, by referring to FIG. 21. In FIG. 21, those parts which are the same as those corresponding parts in FIGS. 2 through 9 are designated by the same reference numerals, and a description thereof will be omitted.

A laser power measuring jig 140 shown in FIG. 21 is made up of a main jig body 11, and a disk shaped filter 141 is provided within the main jig body 11 so that the disk shaped filter 141 is rotatable about a shaft 142. This disk shaped filter 141 has filter characteristics which successively differ linearly along the circumferential direction of the disk shaped filter 141. A belt 144 is provided between the disk shaped filter 141 and a knob 143.

By manipulating the knob 143, the disk shaped filter 141 rotated by a certain angle. Hence, the transmittance of the filter 141 which confronts the photoelectric conversion element 20 via the opening 16 successively changes depending on the rotary displacement of the disk shaped filter 141. The optimum filter characteristic can thus be selected by manipulating the knob 143.

Figure 22:
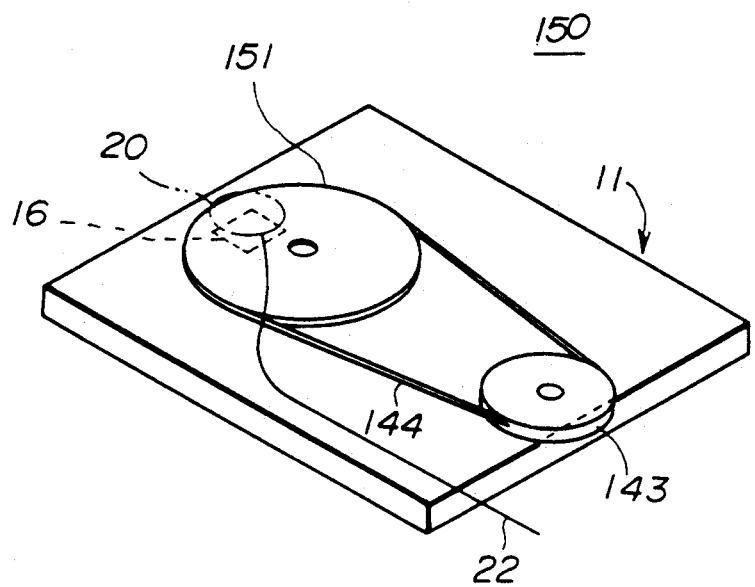
FIG. 22 is a perspective view generally showing an eleventh embodiment of the laser power measuring jig according to the present invention.

Next, a description will be given of the eleventh embodiment of the laser power measuring jig according to the present invention, by referring to FIG. 22. In FIG. 22, those parts which are the same as those corresponding parts in FIG. 21 are designated by the same reference numerals, and a description thereof will be omitted.

A laser power measuring jig 150 shown in FIG. 22 is made up of a main jig body 11, and a disk shaped polarizing plate 151 is rotatably provided on the main jig body 11 in place of the disk shaped filter 141 shown in FIG. 21. In the case where the optical disk unit 2 is designed for use with a magnetooptic disk, the laser beam which is emitted from the optical head 6 is a linearly polarized light, and the transmittance of the laser beam varies when the polarizing plate 151 rotates. Hence, the polarizing plate 151 functions as a filter.

Figure 23:
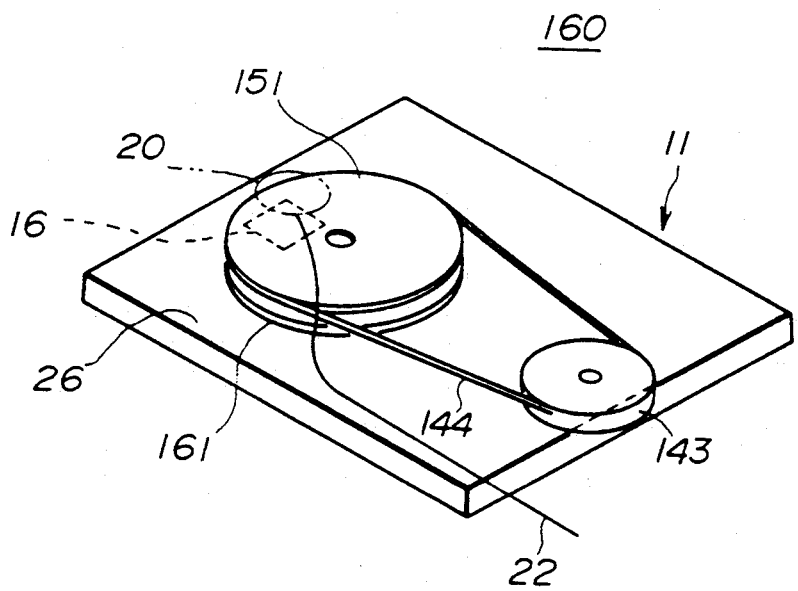
FIG. 23 is a perspective view generally showing a twelfth embodiment of the laser power measuring jig according to the present invention.

Next, a description will be given of the twelfth embodiment of the laser power measuring jig according to the present invention, by referring to FIG. 23. In FIG. 23, those parts which are the same as those corresponding parts in FIG. 22 are designated by the same reference numerals, and a description thereof will be omitted.

A laser power measuring jig 160 shown in FIG. 23 has an additional polarizing plate 161 which is fixed on the bottom plate 26 in addition to the rotary polarizing plate 151 shown in FIG. 22. According to this embodiment, the polarizing plates 151 and 161 function as a filter having a variable transmittance, so that the jig 160 is applicable to the case where the laser beam 45 emitted from the optical head 6 is a circularly polarized light such as the case where the optical disk unit 2 is a laser disk unit or a write-once optical disk unit. Of course, a $\lambda/4$-wave plate may be used in place of the fixed polarizing plate 161.

Next, a description will be given of a thirteenth embodiment of the laser power measuring jig according to the present invention, by referring to FIG. 24. This embodiment is particularly suited for measuring the laser power of the laser beam which is emitted from the optical head of the so-called laser disk unit.

A laser power measuring jig 170 shown in FIG. 24 is made up of a main jig body 171. The main jig body 171 includes a central disk part 172 and an outer ring part 173 which are rotatable independently of each other. A photoelectric conversion element 174 is provided on the outer ring part 173, and wires 175 are drawn out from the photoelectric conversion element 174. The wires 175 have a length $l_3$ such that the wires 175 pass through a laser disk inserting opening of a laser disk unit 176 and tip ends of the wires 175 extend to the outside of the laser disk unit 176 when the main jig body 171 is loaded into the laser disk unit 176. The tip ends of the wires 175 are coupled to a power meter 23.

When measuring the laser power, the main jig body 171 is placed on a tray 177. When placing the main jig body 171 on the tray 177, a positioning pin 178 on the ring part 173 is fitted into a positioning hole 179 in the tray 177, so as to position the photoelectric conversion element 174. Then, the tray 177 is inserted into the laser disk unit 176 by known means. The tray 177 may be inserted into the laser disk unit 176 manually or, automatically by known loading means. As a result, the main jig body 171 is loaded into the laser disk unit 176 similarly as in the case of the laser disk, and the central disk part 172 is clamped by a known clamping means of the laser disk unit 176 and only the central disk part 172 is rotated. The outer ring part 173 does not rotate. Hence, the photoelectric conversion element 174 confronts an optical head (not shown) of the laser disk unit 176 so as to receive the laser beam emitted from the optical head. The laser power of the laser beam emitted from the optical head is displayed on the display of the power meter 23.

Further, the present invention is not limited to these embodiments, but various variations and modifications may be made without departing from the scope of the present invention.

What is claimed is:

1. A laser power measuring jig adapted for use in measuring a laser power of a laser beam which is emitted from an optical head of an optical disk unit which executes at least one of recording information on and reproducing information from a medium, said laser power measuring jig supplying power information related to the laser power of the laser beam to a power meter which measures the laser power, said laser power measuring jig comprising:

a main jig body which has a size and shape which are approximately the same as those of the medium, said main jig body being loadable into the optical disk unit; and information output means, provided within said main jig body, for outputting the power information outside the optical disk unit and supplying the laser power information to the power meter when said main jig body is loaded into the optical disk unit; and wherein;

said information output means comprises;

a photoelectric conversion element for receiving the laser beam emitted from the optical head when said main jig body is loaded into the optical disk unit; and wires, having first and second ends, for supplying the power information to the power meter, said first ends being connected to said photoelectric conversion element, said second ends being coupled to the power meter, said wires each having a length such that the second end extends outside the optical disk unit when said main jig body is loaded into the optical disk unit; and wherein said photoelectric conversion element has a surface for receiving the laser beam emitted from the optical head, and said surface is inclined to a plane which is perpendicular to a center line of the laser beam which irradiates said surface of said photoelectric conversion element.

2. The laser power measuring jig as claimed in claim 1, wherein the medium for use with the optical disk unit takes a form of a cartridge which accommodates an optical disk, and said main jig body has a size and a shape approximately the same as those of the cartridge.

3. A laser power measuring jig adapted for use in measuring a laser power of a laser beam which is emitted from an optical head of an optical disk unit which executes at least one of recording information on and reproducing information from a medium, said laser power measuring jig supplying power information related to the laser power of the laser beam to a power meter which measures the laser power, said laser power measuring jig comprising:

a main jig body which has a size and shape which are approximately the same as those of the medium, said main jig body being loadable into the optical disk unit; and information output means, provided within said main jig body, for outputting the power information outside the optical disk unit and supplying the laser power information to the power meter when said main jig body is loaded into the optical disk unit; and wherein;

said information output means comprises;

a photoelectric conversion element for receiving the laser beam emitted from the optical head when said main jig body is loaded into the optical disk unit; and wires, having first and second ends, for supplying the power information to the power meter, said first ends being connected to said photoelectric conversion element, said second ends being coupled to the power meter, said wires each having a length such that the second end extends outside the optical disk unit when said main jig body is loaded into the optical disk unit; and said laser power measuring jig further comprises a glass cover which covers said photoelectric conversion element.

4. The laser power measuring jig as claimed in claim 3, wherein the medium for use with the optical disk unit has a form of a cartridge which accommodates an optical disk, and said main jig body has a size and a shape approximately the same as those of the cartridge.

5. A laser power measuring jig adapted for use in measuring a laser power of a laser beam which is emitted from an optical head of an optical disk unit which executes at least one of recording information on and reproducing information from a medium, said laser power measuring jig supplying power information related to the laser power of the laser beam to a power meter which measures the laser power, said laser power measuring jig comprising:

a main jig body which has a size and shape which are approximately the same as those of the medium, said main jig body being loadable into the optical disk unit; and information output means, provided within said main jig body, for outputting the power information outside the optical disk unit and supplying the laser power information to the power meter when said main jig body is loaded into the optical disk unit; and wherein;

said information output means comprises;

a photoelectric conversion element for receiving the laser beam emitted from the optical head when said main jig body is loaded into the optical disk unit; and wires, having first and second ends, for supplying the power information to the power meter, said first ends being connected to said photoelectric conversion element, said second ends being coupled to the power meter, said wires each having a length such that the second end extends outside the optical disk unit when said main jig body is loaded into the optical disk unit; and said laser power measuring jig further comprises an enlarging element for enlarging a spot of the laser beam which is irradiated on said photoelectric conversion element.

6. The laser power measuring jig as claimed in claim 5, wherein the medium for use with the optical disk unit has a form of a cartridge which accommodates an optical disk, and said main jig body has a size and a shape approximately the same as those of the cartridge.

7. A laser power measuring jig adapted for use in measuring a laser power of a laser beam which is emitted from an optical head of an optical disk unit which executes at least one of recording information on and reproducing information from a medium, said laser power measuring jig supplying power information related to the laser power of the laser beam to a power meter which measures the laser power, said laser power measuring jig comprising:

a main jig body which has a size and shape which are approximately the same as those of the medium, said main jig body being loadable into the optical disk unit; and information output means, provided within said main jig body, for outputting the power information outside the optical disk unit and supplying the laser power information to the power meter when said main jig body is loaded into the optical disk unit; and wherein;

said information output means comprises;

a photoelectric conversion element for receiving the laser beam emitted form the optical head when said main jig body is loaded into the optical disk unit; and wires, having first and second ends, for supplying the power information to the power meter, said first ends being connected to said photoelectric conversion element, said second ends being coupled to the power meter, said wires each having a length such that the second end extends outside the optical disk unit when said main jig body is loaded into the optical disk unit; and said laser power measuring jig further comprises a reflection preventing part which is provided within said main jig body for preventing reflection of the laser beam within said main jig body, so that reflection of the laser beam back towards the optical head is prevented.

8. The laser power measuring jig as claimed in claim 7, wherein the medium for use with the optical disk unit has a form of a cartridge which accommodates an optical disk, and said main jig body has a size and a shape approximately the same as those of the cartridge.

9. A laser power measuring jig adapted for use in measuring a laser power of a laser beam which is emitted from an optical head of an optical disk unit which executes at least one of recording information on and reproducing information from a medium, said laser power measuring jig supplying power information related to the laser power of the laser beam to a power meter which measures the laser power, said laser power measuring jig comprising:

a main jig body which has a size and shape which are approximately the same as those of the medium, said main jig body being loadable into the optical disk unit; and information output means, provided within said main jig body, for outputting the power information outside the optical disk unit and supplying the laser power information to the power meter when said main jig body is loaded into the optical disk unit; and wherein;

said information output means comprises;

a photoelectric conversion element for receiving the laser beam emitted from the optical head when said main jig body is loaded into the optical disk unit; and wires, having first and second ends, for supplying the power information to the power meter, said first ends being connected to said photoelectric conversion element, said second ends being coupled to the power meter, said wires each having a length such that the second end extends outside the optical disk unit when said main jig body is loaded into the optical disk unit; and said laser power measuring jig further comprises a filter which is provided within said main jig body for attenuating the laser power of the laser beam which is received from the optical head so that an illuminance of the laser beam irradiated on said photoelectric conversion element falls within a predetermined region where an output current of said photoelectric conversion element and an illuminance of the laser beam are proportional.

10. The laser power measuring jig as claimed in claim 9, wherein the medium for use with the optical disk unit has a form of a cartridge which accommodates an optical disk, and said main jig body has a size and a shape approximately the same as those of the cartridge.

* * * * *